US010723662B2

(12) United States Patent
Zhang et al.

(10) Patent No.: US 10,723,662 B2
(45) Date of Patent: Jul. 28, 2020

(54) SPECIAL FILM-COATED CONTROLLED RELEASE FERTILIZER FOR PEANUT IN SALINE-ALKALI SOIL AND PREPARATION PROCESS THEREOF

(71) Applicant: Biotechnology Research Center, Shandong Academy of Agricultural Sciences, Jinan (CN)

(72) Inventors: Jialei Zhang, Jinan (CN); Shubo Wan, Jinan (CN); Feng Guo, Jinan (CN); Xinguo Li, Jinan (CN); Yun Geng, Jinan (CN); Sha Yang, Jinan (CN); Zheng Zhang, Jinan (CN); Haijun Zhao, Jinan (CN); Jingjing Meng, Jinan (CN)

(73) Assignee: BIOTECHNOLOGY RESEARCH CENTER, SHANGDONG ACADEMY OF AGRICULTURAL SCIENCES, Jinan (CN)

(*) Notice: Subject to any disclaimer, the term of this patent is extended or adjusted under 35 U.S.C. 154(b) by 0 days.

(21) Appl. No.: 16/346,234

(22) PCT Filed: Jul. 20, 2018

(86) PCT No.: PCT/CN2018/096535
§ 371 (c)(1),
(2) Date: Apr. 30, 2019

(87) PCT Pub. No.: WO2019/091141
PCT Pub. Date: May 16, 2019

(65) Prior Publication Data
US 2019/0359534 A1    Nov. 28, 2019

(30) Foreign Application Priority Data
Nov. 13, 2017    (CN) .......................... 2017 1 1111016

(51) Int. Cl.
| C05B 7/00 | (2006.01) |
| C05C 9/02 | (2006.01) |
| C05D 3/00 | (2006.01) |
| C05F 3/00 | (2006.01) |
| C05F 11/02 | (2006.01) |
| C05G 3/80 | (2020.01) |
| C05G 5/30 | (2020.01) |
| A01C 21/00 | (2006.01) |

(52) U.S. Cl.
CPC ................. *C05B 7/00* (2013.01); *C05C 9/02* (2013.01); *C05D 3/00* (2013.01); *C05F 3/00* (2013.01); *C05F 11/02* (2013.01); *C05G 3/80* (2020.02); *C05G 5/30* (2020.02); *A01C 21/005* (2013.01)

(58) Field of Classification Search
CPC ........... C05B 7/00; C05D 3/00; C05G 3/0011; C05G 3/04; C05F 3/00; C05F 11/02; C05C 9/02; A01C 21/005
See application file for complete search history.

(56) References Cited

U.S. PATENT DOCUMENTS 4,845,888 A * 7/1989 Lahalih .............. A01G 13/0275
47/9

FOREIGN PATENT DOCUMENTS

| CN | 101323548 A |   | 12/2008 |
| CN | 103420744 A |   | 12/2013 |
| CN | 103193546 A | * | 11/2014 |
| CN | 105367257 A |   | 3/2016 |
| CN | 107382460 A |   | 11/2017 |
| CN | 107793224 A |   | 3/2018 |
| CN | 107827551 A |   | 3/2018 |
| CN | 107857636 A |   | 3/2018 |
| KR | 101464917 B1 |   | 11/2014 |

OTHER PUBLICATIONS

International Search Report (PCT/ISA/210) dated Oct. 8, 2018, by the State Intellectual Property Office of the P.R. China as the International Searching Authority for International Application No. PCT/CN2018/096535.

Written Opinion (PCT/ISA/237) dated Oct. 8, 2018, by the State Intellectual Property Office of the P.R. China as the International Searching Authority for International Application No. PCT/CN2018/096535, and an English translation of the Written Opinion.

* cited by examiner

*Primary Examiner* — Jennifer A Smith

(74) *Attorney, Agent, or Firm* — Buchanan Ingersoll & Rooney PC

(57) ABSTRACT

The invention relates to the field of controlled release fertilizer technology, and in particular to a special film-coated controlled release fertilizer for peanut in saline-alkali soil, which comprises an outer layer, an intermediate layer and an inner layer, integrates the ingredients for salt resistance improvement, etiolated seedling prevention, disease and pest control, growth promotion and pod plumpness promotion, controls the release period, improves the fertilization efficiency without the need of top application throughout the growth period, and saves labor cost.

12 Claims, No Drawings

SPECIAL FILM-COATED CONTROLLED RELEASE FERTILIZER FOR PEANUT IN SALINE-ALKALI SOIL AND PREPARATION PROCESS THEREOF

TECHNICAL FIELD

The invention relates to the field of controlled release fertilizer technology, in particular to a special film-coated controlled release fertilizer for peanut in saline-alkali soil, and further to a preparation process of the special film-coated controlled release fertilizer for peanut in saline-alkali soil.

BACKGROUND

The self-sufficiency rate of edible vegetable oil is less than 32% in China, and can be increased only by expanding farming area. In order to avoid competing with people for grains, and competing with grains for land, vigorously expanding planting in saline-alkali soil to improve the total yield of peanuts is one of the important ways to ensure the safe supply of edible oil in China. As one of the widely cultivated industrial oil crops in the world, peanut is characterized by wide adaptability, drought resistance, barren resistance and symbiosis with nitrogen-fixing rhizobia, contributes to development of water-saving agriculture, improves soil fertility and protects agroecological environment. Improving the area and yield of peanut planted in saline-alkali soil is a task to be completed by peanut researchers.

18 elements are required for peanut growth, where nitrogen, phosphorus, potassium and calcium are most required, and sulfur, boron, molybdenum, zinc, manganese, iron and other trace elements are also indispensable. Through the growth period of peanut, the demand for nutrients is as follows: in the early stage, nitrogen fertilizer is mainly required, and proper amount of nitrogen fertilizer can promote peanut growth and root nodule formation in the seedling stage; in the intermediate stage, calcium fertilizer is mainly required, and is additionally applied to contribute to ideotype formation and promote fruit plumpness; and in the later stage, nitrogen and potassium are mainly required, nitrogen fertilizer is supplemented to prevent fertilizer deficiency in late stage, and potassium fertilizer promotes the transfer of photosynthate to pod. Nitrogen fertilizer is volatile, phosphate fertilizer has weak ability to permeate upward and downward and migrate or diffuse leftward and rightward in soil, potassium fertilizer antagonizes calcium ions, and the root mass of peanut most actively assimilating nutrients is below the fruiting layer. Therefore, peanut fertilizer is most preferably applied to into different layers or released by stages. At present, fertilizers are mainly applied by rationally arranging fertilizer application opportunities, types, quantity and method based on the principle of giving priority to base fertilizer, supplemented by top application, according to the characteristics of peanut's demand for fertilizer and based on the soil fertility. In order to achieve high yield, top application shall be arranged in the middle and later growth stages of peanut, but top application will affect pegging downward and growth. Some fertilizers shall be topdressed under strict conditions, thereby resulting in great difficulties in production. Therefore, top application is labor-consuming and time-consuming.

The prior art provides many solutions for this circumstance, and use of a sustained release and controlled release fertilizer is one widely used solution thereof. For example, CN105367257A discloses a salt-alkali resistant and moistureproof sustained release fertilizer for peanut, including ingredients in the following parts by weight: 30-40 parts of urea, 16-18 parts of ammonium phosphate, 20-30 parts of soybean meal, 15-20 parts of potassium chloride, 12-14 parts of pulverized coal ash, 3-5 parts of polyaspartic acid, 3-5 parts of polysuccinimide, 2-4 parts of mancozeb, 3-5 parts of bactericide, 2-3 parts of brassin, and 1-2 parts of trace element fertilizer. Pulverized coal ash can enable crop straws to become stiff and lodging resistant. Soybean meal is also applied into soil along with a granular fertilizer whilst assimilating moisture in the granular fertilizer and retaining the original granular state thereof, thereby supplementing organic fertilizers into soil. Bactericide and other ingredients reduce drug resistance of crops, have very good control effects, can increase the zinc content in peanut, and promote improvement of the peanut quality. However, the fertilizer fails to improve the salt resistance of peanut, and its nutrient release cannot be synchronous with the peanut demand in growth. In the prior art, there are few controlled release fertilizers integrating salt resistance improvement, etiolated seedling prevention, disease and pest control, growth promotion, pod plumpness promotion, etc.

SUMMARY

In order to solve the problems of high soil salinity and sodicity, easy emergence of etiolated seedling, puny plant, different disease and pest control, later easy occurrence of fertilizer deficiency, and labor-consuming and time-consuming top application in peanut cultivation in saline-alkali soil, the application provides a special film-coated controlled release fertilizer for peanut in saline-alkali soil that integrates the ingredients for salt resistance improvement, etiolated seedling prevention, disease and pest control, growth promotion, pod plumpness promotion, etc., and can control the release period.

The application further provides a preparation process of the special film-coated controlled release fertilizer for peanut in saline-alkaline soil.

The invention is implemented using the following measures:

A special film-coated controlled release fertilizer for peanut in saline-alkaline soil includes an outer layer, an intermediate layer and an inner layer, where the raw materials in each layer and the proportions thereof are as follows:

the outer layer includes: 30-50 parts of urea formaldehyde powder, 2040 parts pf fermented livestock and poultry manure, 30-50 parts of urea, 10-15 parts of hyperbranehed polyamide, 0.5-2 parts of ferrous sulfate, 0.01-0.05 part of chitosan oligosaccharide, and 0.3-0.5 part of CELEST, the intermediate layer includes: 65-85 parts of gypsum, 15-30 parts of humic acid, 0.3-0.5 part of CELEST, and 65-80 parts of urea formaldehyde powder, and the inner layer includes: 60-80 parts of potassium dihydrogen phosphate, 30-50 parts of urea, 10-20 parts of seaweed extract, and 20-50 parts of adhesive.

In the special film-coated controlled release fertilizer for peanut in saline-alkali soil, the raw materials in each layer and the proportions thereof are preferably as follows:

the outer layer includes: 40 parts of urea formaldehyde powder, 30 parts of fermented livestock and poultry manure, 40 parts of urea, 13 parts of hyperbranehed polyamide, 2 parts of ferrous sulfate, 0.03 part of chitosan oligosaccharide, and 0.4 part of CELEST, the intermediate layer includes: 75 parts of gypsum, 25 parts of humic acid, 0.5 part of CELEST, and 75 parts of urea formaldehyde powder, and the inner layer includes: 70 parts of potassium dihydrogen phosphate, 70 parts of urea, 17 parts of seaweed extract, and 35 parts of adhesive.

In the special film-coated controlled release fertilizer for peanut in saline-alkali soil, the hyperbranched polyamide is preferably an aliphatic hyperbranched polyamide of 2.0, 3.0 or 4.0 branching generation.

In the special film-coated controlled release fertilizer for peanut in saline-alkali soil, the fermented livestock and poultry manure is preferably obtained from the following steps:

mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing; and 1 mL of the fermentation agent contains $1-1.5 \times 10^9$ *Streptococcus thermophilus*, $0.3-0.5 \times 10^8$ IU neutral protease, $0.1 \times 0.2 \times 10^6$ IU cellulase, $3-4 \times 10^5$ IU triacylglycerol acylhydrolase, $1-2 \times 10^5$ IU beer yeast and $3-4 \times 10^6$ IU *Bacillus subtilis*.

A preparation process of the special film-coated controlled release fertilizer for peanut in saline-alkali soil includes the following steps:

(1) mixing the raw materials potassium dihydrogen phosphate, urea, seaweed extract and adhesive in the inner layer, granulating and drying to obtain granules in the inner layer;

(2) mixing the raw materials gypsum, humic acid, CELEST and urea formaldehyde powder in the intermediate layer, adding the granules in the inner layer obtained in step (1), granulating and drying to obtain granules in the intermediate layer; and (3) mixing the raw materials urea formaldehyde powder, fermented livestock and poultry manure, urea, hyperbranehed polyamide, ferrous sulfate, chitosan oligosaccharide and CELEST in the outer layer, adding the granules in the intermediate layer obtained in step (2), granulating and drying.

In an application of the special film-coated controlled release fertilizer for peanut in saline-alkali soil, the soil conditions for planting peanut are as follows: organic matter content: 10-13 g/kg, alkali-hydrolyzable nitrogen content: 40-60 mg/kg, rapidly available phosphorus content: 40-70 mg/kg, rapidly available potassium content: 70-90 mg/kg, exchangeable calcium content: 3-6 mg/kg, salt content: 0.23%-0.30%, pH: 7.5-8.5, moisture content from seeding time to seedling stage: 55-65%, moisture content from flowering stage to pod-bearing stage: 65-75%, moisture content from fruit expansion stage to maturation stage: 55-65%.

In the application, the film-coated controlled release fertilizer is preferably applied at a rate of 50±2 kg/Mu along with seeding or rotary tillage before seeding.

CELEST is a suspension seed coating agent containing 2.5% fludioxonil (international generic name), and can be used for controlling a plurality of seed-borne and soil-borne fungal diseases of crops.

Repeated trials show that when urea formaldehyde powder is used together with fermented livestock and poultry manure and urea, and the use levels of fermented livestock and poultry manure and urea are more than a certain proportion, the release rate in early stage is increased, which does not contribute to realization of the controlled release effect. Therefore, a small amount of hyperbranched polyamide, if mixed therewith, can guarantee low release rate in early stage and improve the controlled release effect whilst improving the proportions of fermented livestock and poultry manure and urea.

The invention has the following beneficial effects:

(1) the fertilizer is applied, as a seed fertilizer. In about 10 days (seedling stage) after seeding, the fertilizer releases iron, chitosan oligosaccharide and CELEST to prevent etiolated seedling, enhance salt resistance of seedling, and control diseases. The fertilizer releases nitrogen in the seedling stage to promote growth and promote root nodule formation by rhizobial infection. In about 50 days (pegging stage) after seeding, the fertilizer releases calcium fertilizer and bactericide to control leaf spot. In about 90 days (fruit expansion stage) after seeding, by sustained release of potassium hydrogen phosphate and urea, the fertilizer prevents later fertilizer deficiency caused by rhizobium rupture. In the later stage, the fertilizer releases seaweed extract to enhance protective enzyme activities, prevent premature senescence and promote accumulation of photosynthate.

(2) The fertilizer integrates the ingredients for salt resistance improvement, etiolated seedling prevention, disease and pest control and pod plumpness promotion, controls the release period, improves fertilization efficiency without the need of top application throughout the growth period, and saves labor cost.

DESCRIPTION OF THE EMBODIMENTS

In order to better understand the invention, the invention is further described below in conjunction with the examples.

Example 1

A special film-coated controlled release fertilizer for peanut in saline-alkaline soil includes an outer layer, an intermediate layer and an inner layer, where the raw materials in each layer and the proportions thereof are as follows:

the outer layer includes: 30 parts of urea formaldehyde powder, 40 parts of fermented livestock and poultry manure, 30 parts of urea, 15 parts of hyperbranched polyamide, 5.5 part of ferrous sulfate, 0.05 part of chitosan oligosaccharide, and 0.3 part of CELEST, the intermediate layer includes: 85 parts of gypsum, 15 parts of humic acid, 0.5 part of CELEST, and 65 parts of urea formaldehyde powder, and the inner layer includes: 80 parts of potassium dihydrogen phosphate, 30 parts of urea, 20 parts of seaweed extract, and 20 parts of adhesive.

The hyperbranched polyamide is an aliphatic hyperbranched polyamide of 2.0 branching generation.

Preparation Process (1) mixing the raw materials potassium dihydrogen phosphate, urea, seaweed extract and adhesive in the inner layer, granulating and drying to obtain granules in the inner layer;

(2) mixing the raw materials gypsum, humic acid, CELEST and urea formaldehyde powder in the intermediate layer, adding the granules in the inner layer obtained in step (1), granulating and drying to obtain granules in the intermediate layer; and (3) mixing the raw materials urea formaldehyde powder, fermented livestock and poultry manure, urea, hyperbranched polyamide, ferrous sulfate, chitosan oligosaccharide and CELEST in the outer layer, adding the granules in the intermediate layer obtained in step (2), granulating and drying, Example 2

A special film-coated controlled release fertilizer for peanut in saline-alkaline soil includes an outer layer, an intermediate layer and an inner layer, where the raw materials in each layer and the proportions thereof are as follows:

the outer layer includes: 30 parts of urea formaldehyde powder, 40 parts of fermented livestock and poultry manure, 30 parts of urea, 15 parts of hyperbranched polyamide, 0.5 part of ferrous sulfate, 0.05 part of chitosan oligosaccharide, and 0.3 part of CELEST, the intermediate layer includes: 85 parts of gypsum, 15 parts of humic acid, 0.5 part of CELEST, and 65 parts of urea formaldehyde powder, and the inner layer includes: 80 parts of potassium dihydrogen phosphate, 30 parts of urea, 20 parts of seaweed extract, and 20 parts of adhesive.

The hyperbranched polyamide is an aliphatic hyperbranched polyamide of 3.0 branching generation.

The preparation process is the same as that in Example 1.

Example 3

A special film-coated controlled release fertilizer for peanut in saline-alkaline soil includes an outer layer, an intermediate layer and an inner layer, where the raw materials in each layer and the proportions thereof are as follows:

the outer layer includes: 30 parts of urea formaldehyde powder, 40 parts of fermented livestock and poultry manure, 30 parts of urea, 15 parts of hyperbranched polyamide, 0.5 part of ferrous sulfate, 0.05 part of chitosan oligosaccharide, and 0.3 part of CELEST, the intermediate layer includes: 85 parts of gypsum, 15 parts of humic acid, 0.5 part of CELEST, and 65 parts of urea formaldehyde powder, and the inner layer includes: 80 parts of potassium dihydrogen phosphate, 30 parts of urea, 20 parts of seaweed extract, and 20 parts of adhesive.

The hyperbranched polyamide is an aliphatic hyperbranched polyamide of 4.0 branching generation.

The preparation process is the same as that in Example 1.

Example 4

A special film-coated controlled release fertilizer for peanut in saline-alkaline soil includes an outer layer, an intermediate layer and an inner layer, where the raw materials in each layer and the proportions thereof are as follows:

the outer layer includes: 50 parts of urea formaldehyde powder, 20 parts of fermented livestock and poultry manure, 50 parts of urea, 10 parts of hyperbranched polyamide, 2 part of ferrous sulfate, 0.01 part of chitosan oligosaccharide, and 0.5 part of CELEST, the intermediate layer includes: 65 parts of gypsum, 30 parts of tannic acid, 0.3 part of CELEST, and 78 parts of urea formaldehyde powder, and the inner layer includes: 60 parts of potassium dihydrogen phosphate, 50 parts of urea, 10 parts of seaweed extract, and 50 parts of adhesive.

The hyperbranched polyamide is an aliphatic hyperbranched polyamide of 2.0 branching generation.

The preparation process is the same as that in Example 1.

Example 5

A special film-coated controlled release fertilizer for peanut in saline-alkaline soil includes an outer layer, an intermediate layer and an inner layer, where the raw materials in each layer and the proportions thereof are as follows:

the outer layer includes: 50 parts of urea formaldehyde powder, 20 parts of fermented livestock and poultry manure, 50 parts of urea, 10 parts of hyperbranched polyamide, 2 part of ferrous sulfate, 0.01 part of chitosan oligosaccharide, and 0.5 part of CELEST, the intermediate layer includes: 65 parts of gypsum, 30 parts of titanic acid 0.3 part of CELEST, and 78 pans of urea formaldehyde powder, and the inner layer includes: 60 parts of potassium dihydrogen phosphate, 50 parts of urea, 10 parts of seaweed extract, and 50 parts of adhesive.

The hyperbranched polyamide is an aliphatic hyperbranched polyamide of 3.0 branching generation.

The preparation process is the same as that in Example 1.

Example 6

A special film-coated controlled release fertilizer for peanut in saline-alkaline soil includes an outer layer, an intermediate layer and an inner layer, where the raw materials in each layer and the proportions thereof are as follows:

the outer layer includes: 50 parts of urea formaldehyde powder, 20 parts of fermented livestock and poultry manure, 50 parts of urea, 10 parts of hyperbranched polyamide, 2 part of ferrous sulfate, 0.01 part of chitosan oligosaccharide, and 4.5 part of CELEST, the intermediate layer Includes: 65 parts of gypsum, 30 parts of humic acid, 0.3 part of CELEST, and 78 parts of urea formaldehyde powder, and the inner layer includes: 60 parts of potassium dihydrogen phosphate, 50 parts of urea, 10 parts of seaweed extract, and 50 parts of adhesive.

The hyperbranched polyamide is an aliphatic hyperbranched polyamide of 4.0 branching generation.

The preparation process is the same as that in Example 1.

Example 7

A special film-coated controlled release fertilizer for peanut in saline-alkaline soil includes an outer layer, an intermediate layer and an inner layer, where the raw materials in each layer and the proportions thereof are as follows:

the outer layer includes: 40 parts of urea formaldehyde powder, 30 parts of fermented livestock and poultry manure, 40 parts of urea, 13 parts of hyperbranched polyamide, 2 part of ferrous sulfate, 0.03 part of chitosan oligosaccharide, and 0.4 part of CELEST, the intermediate layer includes: 75 parts of gypsum, 25 parts of humic acid, 0.5 part of CELEST, and 75 parts of urea formaldehyde powder, and the inner layer includes: 70 parts of potassium dihydrogen phosphate, 70 parts of urea, 17 parts of seaweed extract, and 35 parts of adhesive.

The hyperbranched polyamide is an aliphatic hyperbranched polyamide of 2.0 branching generation.

The preparation process is the same as that in Example 1.

Example 8

A special film-coated controlled release fertilizer for peanut in saline-alkaline soil includes an outer layer, an intermediate layer and an inner layer, where the raw materials in each layer and the proportions thereof are as follows:

the outer layer includes: 40 parts of urea formaldehyde powder, 30 parts of fermented livestock and poultry manure, 40 parts of urea, 13 parts of hyperbranched polyamide, 2 part of ferrous sulfate, 0.03 part of chitosan oligosaccharide, and 0.4 part of CELEST, the intermediate layer includes: 75 parts of gypsum, 25 parts of humic acid, 0.5 part of CELEST, and 75 parts of urea formaldehyde powder, and the inner layer includes: 70 parts of potassium dihydrogen phosphate, 70 parts of urea, 17 parts of seaweed extract, and 35 parts of adhesive.

The hyperbranched polyamide is an aliphatic hyperbranched polyamide of 3.0 branching generation.

The preparation process is the same as that in Example 1.

Example 9

A special film-coated controlled release fertilizer for peanut in saline-alkaline soil includes an outer layer, an intermediate layer and an inner layer, where the raw materials in each layer and the proportions thereof are as follows:

the outer layer includes: 40 parts of urea formaldehyde powder, 30 parts of fermented livestock and poultry manure, 40 parts of urea, 13 parts of hyperbranehed polyamide, 2 part of ferrous sulfate, 0.03 part of chitosan oligosaccharide, and 0.4 part of CELEST, the intermediate layer includes: 75 parts of gypsum, 25 parts of humic acid, 0.5 part of CELEST, and 75 parts of urea formaldehyde powder, and the inner layer includes: 70 parts of potassium dihydrogen phosphate, 70 parts of urea, 17 parts of seaweed extract, and 35 parts of adhesive.

The hyperbranched polyamide is an aliphatic hyperbranched polyamide of 4.0 branching generation.

The preparation process is the same as that in Example 1.

Examples 1, 2 and 3 are different in that hyperbranched polyamides of different branching generations were used, Examples 4, 5 and 6 are different in that hyperbranched polyamides of different branching generations were used, and Examples 7, 8 and 9 are different in that hyperbranched polyamides of different branching generations were used.

Comparison Example 1

The Comparison Example 1 is the same as Example 1 except that in the raw materials in the outer layer, hyperbranched polyamide was not used, the use level of urea formaldehyde powder was changed to 35 parts, the use level of fermented livestock and poultry manure was changed to 45 parts, and the use level of urea was changed to 35 parts.

Research on Controlled Release Properties

Controlled release properties of the nutrients in the controlled release fertilizer prepared in the Examples 1-9 are evaluated using the soil culture method. The specific operation is as follows:

The controlled release fertilizer packed in a nylon net was applied to saline-alkali soil (11.7 g/kg organic matter, 53.6 mg/kg alkali-hydrolyzable nitrogen, 65.4 mg/kg readily available phosphorus, 82.4 mg/kg readily available potassium, 5.4 mg/kg exchangeable calcium, 0.25% salt concentration, pH: 7.6), the fertilizer weight was measured at regular intervals, and then the active ingredients were converted to obtain the contents of the active ingredients released from the controlled release fertilizer, which were compared with the nutrient requirements of peanut in various growth stages.

The soil temperature and humidity of peanut in various stages were controlled as follows: daily average ground temperature: 15-20° C., moisture content: 55-65% in the early stage (seeding time to seedling stage); daily average ground temperature: 20-28° C., moisture content 65-75% in the intermediate stage (flowering stage to pod-bearing stage); and the daily average ground temperature: 28-35° C., moisture content: 55-65% in the later stage (fruit expansion stage to maturation stage.

| Processing | Cumulative release rate of active ingredients on different days (%) | | | | | | | | |
|---|---|---|---|---|---|---|---|---|---|
| | 10 d Before seedling stage | 30 d Seedling stage | 40 d Flowering stage | 55 d Pegging stage | 70 d Pod-bearing stage | 85 d Pod-bearing stage | 100 d Fruit expansion stage | 115 d Fruit expansion stage | 130 d Maturation stage |
| Example 1 | 9.9 | 18.7 | 36.3 | 47.4 | 56.8 | 74.2 | 86.3 | 87.3 | 88.9 |
| Example 2 | 8.7 | 17.4 | 34.6 | 46.2 | 54.1 | 71.7 | 85.0 | 86.6 | 88.0 |
| Example 3 | 7.4 | 15.2 | 33.2 | 42.6 | 52.3 | 69.3 | 83.4 | 84.9 | 87.4 |
| Example 4 | 7.5 | 13.2 | 22.1 | 36.7 | 45.3 | 54.6 | 61.7 | 70.6 | 81.5 |
| Example 5 | 6.7 | 11.5 | 20.6 | 34.5 | 42.5 | 52.2 | 58.9 | 66.9 | 79.4 |
| Example 6 | 6.1 | 11.2 | 19.3 | 32.1 | 40.3 | 51.4 | 56.7 | 66.7 | 77.3 |
| Example 7 | 8.3 | 14.3 | 28.9 | 42.3 | 54.3 | 68.5 | 78.4 | 86.4 | 92.1 |
| Example 8 | 7.5 | 13.3 | 26.4 | 40.5 | 52.7 | 66.7 | 76.8 | 85.8 | 91.3 |
| Example 9 | 7.2 | 12.4 | 25.3 | 38.5 | 50.6 | 64.9 | 74.6 | 83.7 | 90.7 |
| Comparison Example 1 | 14.5 | 28.7 | 42.1 | 55.8 | 67.3 | 84.4 | 89.6 | 90.7 | 92.0 |

In Examples 1, 2 and 3, the active ingredients are very fast released in the early stage, and insufficiently released in the later stage, thereby affecting pod growth. In Examples 4, 5 and 6, the active ingredients are very slowly released, and cannot very well meet required nutrients in the seedling stage, and the release is not finished in the later stage, thereby resulting in waste of active ingredients. In Examples 7, 8 and 9, the release can very well meet the required active ingredients of peanut plant in various growth stages. The utilization rate of the active ingredients in Example 7 is higher than that in Examples 7, 8 and 9. Compared with Example 1, in Comparison Example 1, in the raw materials in the outer layer, hyperbranched polyamide was not added, and the fertilizer was fast released in the early stage, so that the release of the active components in each layer cannot well comply with the demand for active ingredients of peanut in various growth stages.

Effects on Pod Yield and Seed Kernel Quality

A field experiment was carried out in saline-alkali soil of Dongying Guangbei Farm (the soil includes 10.9 g/kg organic matter, 49.5 mg/kg alkali-hydrolyzable nitrogen, 54.7 mg/kg readily available phosphorus, 80.2 mg/kg readily available potassium, 4.9 mg/kg exchangeable calcium, 0.24% salt concentration, pH 7.9) by applying the controlled release fertilizer in the examples to an experimental material Huayu No. 22 along with seeding at a rate of 50 kg/Mu, and a common NPK compound fertilizer (15-15-15) was used as a control at a rate of 50 kg/Mu. The experiment was carried out by seeding on May 4 in an area of 33.3 m$^2$, mulched ridge-furrow cultivation, and harvesting on September 23, and was repeated 3 times.

| Processing | Pod yield (kg/667 m$^2$) | Wormy fruit rate (%) | Plump fruit rate (%) | Kernel rate (%) | Protein content (%) | Fat content (%) | O/L |
|---|---|---|---|---|---|---|---|
| Control | 336.7 | 15.8 | 56.3 | 67.6 | 23.1 | 49.5 | 1.32 |
| Example 1 | 395.4 | 6.3 | 65.6 | 69.2 | 23.5 | 50.2 | 1.37 |
| Example 2 | 387.6 | 6.4 | 64.1 | 68.4 | 23.4 | 50.4 | 1.36 |
| Example 3 | 392.7 | 5.7 | 66.2 | 68.5 | 23.6 | 49.9 | 1.37 |
| Example 4 | 385.4 | 7.5 | 63.6 | 69.5 | 23.6 | 50.7 | 1.39 |
| Example 5 | 369.3 | 7.1 | 64.9 | 68.9 | 23.4 | 50.5 | 1.40 |
| Example 6 | 372.5 | 7.4 | 65.3 | 68.8 | 24.1 | 50.1 | 1.38 |
| Example 7 | 407.7 | 2.8 | 67.5 | 71.2 | 24.3 | 51.2 | 1.41 |
| Example 8 | 395.6 | 3.2 | 66.6 | 70.7 | 24.2 | 50.7 | 1.42 |
| Example 9 | 396.5 | 3.3 | 67.1 | 70.2 | 24.0 | 50.6 | 1.40 |
| Comparison Example 1 | 364.5 | 2.6 | 63.2 | 68.3 | 23.2 | 49.8 | 1.35 |

Compared with the control sample, the peanut yield in the examples was significantly increased, and the pod yield was increased by 9.7%-21.1%, because the number of fruits on single plants and the plump fruit rate were significantly increased, and the number of wormy fruits was significantly decreased. In the examples, the etiolated seedling rate is significantly lower than that of the control sample, the dry matter weight and total biological yield of individual plants are significantly enhanced, and the stay-green trait is good in later growth stage, thereby effectively expanding photosynthetic areas, extending photosynthetic duration, and promoting dry matter accumulation. In the examples, the protein content, fat content and the O/L in kernels are significantly are higher than those of the control sample, and the seed kernel quality is significantly improved. In Example 7 with the optimal proportion, the pod yield was increased by 21.1%, the protein content was increased by 1.2%, the fat content was increased by 1.7%, and the O/L was increased by 6.8%, compared with the control sample. Both the pod yield and quality in the Comparison Example 1 are slightly worse than those in Examples 1-9.

As can be seen from the comparison of the cumulative release rate of active ingredients, pod yield and seed kernel quality in the above two tables, the controlled release fertilizer according to the application enables the active ingredient release to comply with element demand in the peanut growth period by selection and optimization of controlled release ingredients according to the saline-alkali soil characteristics, integrates the ingredients for salt resistance improvement, etiolated seedling prevention, disease and pest control, growth promotion, pod plumpness promotion, etc., improves the fertilizer efficiency without the need of top application throughout the growth period, and saves labor cost. The fertilizer can significantly improve the pod yield and seed kernel quality, and overcome the adverse effects of saline-alkali soil on peanut growth. The fertilizer is an efficient special controlled release fertilizer for planting peanut in saline-alkali soil contributing to high yield and high quality, and has very high popularization and application values.

The above examples are preferred embodiments of the invention, but the embodiments of the invention are not limited to the examples. All alterations, modifications, combinations, substitutions and simplifications made without departing from the spiritual essence and principle of the invention shall be equivalent substitution modes, and shall be encompassed within the scope of protection of the invention.

What is claimed is:

1. A film-coated controlled release fertilizer for peanut in saline-alkali soil, comprising an outer layer, an intermediate layer and an inner layer, wherein raw materials in each layer and proportions thereof are as follows:
    the outer layer comprises: 30-50 parts of urea formaldehyde powder, 20-40 parts of fermented livestock and poultry manure, 30-50 parts of urea, 10-15 parts of hyperbranched polyamide, 0.5-2 parts of ferrous sulfate, 0.01-0.05 part of chitosan oligosaccharide, and 0.3-0.5 part of a suspension seed coating agent containing 2.5% fludioxonil,
    the intermediate layer comprises: 65-85 parts of gypsum, 15-30 parts of humic acid, 0.3-0.5 part of a suspension seed coating agent containing 2.5% fludioxonil, and 65-80 parts of urea formaldehyde powder, and
    the inner layer comprises: 60-80 parts of potassium dihydrogen phosphate, 30-50 parts of urea, 10-20 parts of seaweed extract, and 20-50 parts of adhesive,
    wherein a suspension seed coating agent containing 2.5% fludioxonil is a suspension containing 2.5% fludioxonil.

2. A film-coated controlled release fertilizer for peanut in saline-alkali soil, comprising an outer layer, an intermediate layer and an inner layer, wherein raw materials in each layer and proportions thereof are as follows:
    the outer layer comprises: 40 parts of urea formaldehyde powder, 30 parts of fermented livestock and poultry manure, 40 parts of urea, 13 parts of hyperbranched polyamide, 2 part of ferrous sulfate, 0.03 part of chitosan oligosaccharide, and 0.4 part of a suspension seed coating agent containing 2.5% fludioxonil,
    the intermediate layer comprises: 75 parts of gypsum, 25 parts of humic acid, 0.5 part of a suspension seed coating agent containing 2.5% fludioxonil, and 75 parts of urea formaldehyde powder, and the inner layer comprises: 70 parts of potassium dihydrogen phosphate, 70 parts of urea, 17 parts of seaweed extract, and 35 parts of adhesive, wherein a suspension seed coating agent containing 2.5% fludioxonil is a suspension containing 2.5% fludioxonil.

3. The film-coated controlled release fertilizer for peanut in saline-alkali soil according to claim 1, wherein the hyperbranched polyamide is an aliphatic hyperbranched polyamide of 2.0, 3.0 or 4.0 branching generation.

4. The film-coated controlled release fertilizer for peanut in saline-alkali soil according to claim 1, wherein the fermented livestock and poultry manure is obtained from the following steps:

mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding $\frac{1}{6}$-$\frac{1}{4}$ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing;

wherein 1 mL of the fermentation agent contains 1-1.5× $10^9$ *Streptococcus thermophilus*, 0.3-0.5×$10^8$ IU neutral protease, 0.1-0.2×$10^6$ IU cellulase, 3-4×$10^5$ IU triacylglycerol acylhydrolase, 1-2×$10^5$ IU beer yeast and 3-4×$10^6$ IU *Bacillus subtilis*.

5. A preparation process of the film-coated controlled release fertilizer for peanut in saline-alkali soil according to claim 1, comprising the following steps:

(1) mixing the raw materials potassium dihydrogen phosphate, urea, seaweed extract and adhesive in the inner layer, granulating and drying to obtain granules in the inner layer;

(2) mixing the raw materials gypsum, humic acid, a suspension seed coating agent containing 2.5% fludioxonil and urea formaldehyde powder in the intermediate layer, adding the granules in the inner layer obtained in step (1), granulating and drying to obtain granules in the intermediate layer; and (3) mixing the raw materials urea formaldehyde powder, fermented livestock and poultry manure, urea, hyperbranched polyamide, ferrous sulfate, chitosan oligosaccharide and a suspension seed coating agent containing 2.5% fludioxonil in the outer layer, adding the granules in the intermediate layer obtained in step (2), granulating and drying.

6. An application of the film-coated controlled release fertilizer for peanut in saline-alkali soil according to claim 1, wherein the soil conditions for planting peanut are as follows: organic matter content: 10-13 g/kg, alkali-hydrolyzable nitrogen content: 40-60 mg/kg, rapidly available phosphorus content: 40-70 mg/kg, rapidly available potassium content: 70-90 mg/kg, exchangeable calcium content: 3-6 mg/kg, salt content: 0.23%-0.30%, pH: 7.5-8.5, moisture content from seeding time to seedling stage: 55-65%, moisture content from flowering stage to pod-bearing stage: 65-75%, moisture content from fruit expansion stage to maturation stage: 55-65%.

7. The application according to claim 6, wherein the coated controlled release fertilizer is applied at a rate of 50±2 kg/Mu along with seeding or rotary tillage before seeding.

8. The film-coated controlled release fertilizer for peanut in saline-alkali soil according to claim 2, wherein the hyperbranched polyamide is an aliphatic hyperbranched polyamide of 2.0, 3.0 or 4.0 branching generation.

9. The film-coated controlled release fertilizer for peanut in saline-alkali soil according to claim 2, wherein the fermented livestock and poultry manure is obtained from the following steps:

mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding $\frac{1}{6}$-$\frac{1}{4}$ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing; and wherein 1 mL of the fermentation agent contains 1-1.5× $10^9$ *Streptococcus thermophilus*, 0.3-0.5×$10^8$ IU neutral protease, 0.1-0.2×$10^6$ IU cellulase, 3-4×$10^5$ IU triacylglycerol acylhydrolase, 1-2×$10^5$ IU beer yeast and 3-4×$10^6$ IU *Bacillus subtilis*.

10. A preparation process of the film-coated controlled release fertilizer for peanut in saline-alkali soil according to claim 2, comprising the following steps:

(1) mixing the raw materials potassium dihydrogen phosphate, urea, seaweed extract and adhesive in the inner layer, granulating and drying to obtain granules in the inner layer;

(2) mixing the raw materials gypsum, humic acid, a suspension seed coating agent containing 2.5% fludioxonil and urea formaldehyde powder in the intermediate layer, adding the granules in the inner layer obtained in step (1), granulating and drying to obtain granules in the intermediate layer; and (3) mixing the raw materials urea formaldehyde powder, fermented livestock and poultry manure, urea, hyperbranched polyamide, ferrous sulfate, chitosan oligosaccharide and a suspension seed coating agent containing 2.5% fludioxonil in the outer layer, adding the granules in the intermediate layer obtained in step (2), granulating and drying.

11. An application of the film-coated controlled release fertilizer for peanut in saline-alkali soil according to claim 2, wherein the soil conditions for planting peanut are as follows: organic matter content: 10-13 g/kg, alkali-hydrolyzable nitrogen content: 40-60 mg/kg, rapidly available phosphorus content: 40-70 mg/kg, rapidly available potassium content: 70-90 mg/kg, exchangeable calcium content: 3-6 mg/kg, salt content: 0.23%-0.30%, pH: 7.5-8.5, moisture content from seeding time to seedling stage: 55-65%, moisture content from flowering stage to pod-bearing stage: 65-75%, moisture content from fruit expansion stage to maturation stage: 55-65%.

12. The application according to claim 11, wherein the coated controlled release fertilizer is applied at a rate of 50±2 kg/Mu along with seeding or rotary tillage before seeding.

\* \* \* \* \*